(12) United States Patent
Chen

(10) Patent No.: US 12,554,384 B2
(45) Date of Patent: Feb. 17, 2026

(54) SYSTEMS AND METHODS FOR IMPROVED CONTENT EDITING AT A COMPUTING DEVICE

(71) Applicant: Adeia Imaging LLC, San Jose, CA (US)

(72) Inventor: Tao Chen, Palo Alto, CA (US)

(73) Assignee: Adeia Imaging LLC, San Jose, CA (US)

(*) Notice: Subject to any disclaimer, the term of this patent is extended or adjusted under 35 U.S.C. 154(b) by 285 days.

(21) Appl. No.: 18/199,695

(22) Filed: May 19, 2023

(65) Prior Publication Data

US 2024/0385736 A1 Nov. 21, 2024

(51) Int. Cl.
*G06F 3/04845* (2022.01)
*G06F 3/04817* (2022.01)
*G06T 5/50* (2006.01)

(52) U.S. Cl.
CPC ...... *G06F 3/04845* (2013.01); *G06F 3/04817* (2013.01); *G06T 5/50* (2013.01); *G06T 2207/20221* (2013.01)

(58) Field of Classification Search
CPC ... G06F 3/04845; G06F 3/04817; G06T 5/50; G06T 2207/20221; G06T 11/60
See application file for complete search history.

(56) References Cited

U.S. PATENT DOCUMENTS

| | | | |
|---|---|---|---|
| 6,883,140 B1* | 4/2005 | Acker | G06T 11/60 715/845 |
| 2006/0146065 A1* | 7/2006 | Wada | H04N 9/73 345/590 |
| 2009/0164561 A1* | 6/2009 | Ono | H04N 1/00156 715/243 |
| 2015/0371422 A1* | 12/2015 | Kokemohr | G06T 11/60 382/311 |

OTHER PUBLICATIONS

Anonymous, "Edit photos and videos on iPhone," Apple Support (https://support.apple.com/guide/iphone/edit-photos-and-videos-iphb08064d57/ios) (downloaded Jul. 18, 2023) (4 pages).
Anonymous, "Edit your photos," Google Support (https://support.google.com/photos/answer/6128850?hl=en&co=GENIE.Platform%3DAndroid) (downloaded Jul. 18, 2023).
Display Mate Technologies, "Welcome to DisplayMate on the Web," (https://www.displaymate.com/) (downloaded Jul. 18, 2023) (1 page).

* cited by examiner

*Primary Examiner* — William A Beutel
(74) *Attorney, Agent, or Firm* — HG Law LLP

(57) ABSTRACT

Systems and methods are provided for improving image item editing. An image item is selected at a computing device and with an editing application, and a preferred editing option to apply to the image item is identified via a user profile. The preferred editing option is determined based on historic editing actions for a plurality of different image items. An icon for applying the preferred editing option to the image item is generated for display in a user (Continued)

interface of the editing application. User input associated with the icon is received, and the preferred editing option is applied to the image item.

18 Claims, 11 Drawing Sheets

SYSTEMS AND METHODS FOR IMPROVED CONTENT EDITING AT A COMPUTING DEVICE

One or more disclosed embodiments are directed towards systems and methods for enabling improved content (e.g., image) editing at a computing device. In particular, systems and methods are provided herein that enable improved content editing at a computing device where a preferred editing option is determined based on historic editing actions for a plurality of different content items, and the preferred editing option is applied to a content item or multiple selected content items.

SUMMARY

With the proliferation of smartphones and image editing applications, image editing and image sharing on smartphones has become increasingly convenient and popular. Smartphone camera sensors, and computational imaging capabilities on smartphones, have both been continuously advancing, with camera sensors being able to capture increasingly detailed images, and captured images able to be processed and edited with effects, touch-ups and alterations that require ever increasing computing power. Image editing applications may offer users a wide range of editing options that may be applied to an image including, for example, changing the contrast, changing the white point, applying a filter and/or removing sections of an image. In the case of image editing on, for example, a smartphone, the final effect, or look, that is achieved in an editing application may be the result of cascaded filtering and adjustments. Some applications may provide an option of saving the editing choices and parameters while retaining the original image, in the same file. This may closely couple with the file format (typically an intermediate file format) that specific application supports, and the resultant file may not be interoperable, or compliant, with file formats that are supported by other applications. When a user chooses to share the image post editing, the content may be converted to a most supported format. The editing choices that a user made, for example as metadata carried in an intermediate format, may be lost. In addition, with the wide range of editing options that are available and that are typically presented to a user, users may become confused and/or reluctant to edit many of their captured photos. Furthermore, when a user edits an image, they may wish to have an easy way of observing the differences that the edits made to an original image, and they may wish to easily share edited images with other users, in a manner that enables the edits to be easily viewed.

To help overcome these problems, systems and methods are provided herein that enable improved image editing at a computing device. In accordance with some aspects of the disclosure, a method is provided. The method includes selecting an image item at a computing device and with an editing application. A preferred editing option to apply to the image item is identified via a user profile, wherein the preferred editing option is determined based on historic editing actions for a plurality of different image items. An icon for applying the preferred editing option to the image item is generated for display in a user interface of the editing application, and user input associated with the icon is received. The preferred editing option is applied to the image item. In some examples, the image item may be a content item. A content item includes an image item, but also includes audio, video, text, multimedia, a video game, a screen share and/or any other media content.

In an example system, a user logs in to, and accesses an image editing application running on a smartphone. On accessing the image editing application, the user selects an image via the image editing application and selects an icon, for example an "Auto Edit" icon, associated with applying a preferred editing option to the image. In this example, a user profile associated with the user's login details indicates that a sepia filter is usually applied to an image of a certain brightness. On receiving user input associated with the icon, it is identified that the selected image is of that certain brightness, and a sepia filter is identified as the preferred editing option. The preferred editing option, in this case the sepia filter, is applied to the image item.

Selecting the image item may further comprise selecting a plurality of image items, and generating the icon may further comprise generating the icon for applying the preferred editing option to the plurality of image items. Applying the preferred editing option may further comprise applying the preferred editing option to each image item of the plurality of image items.

A second icon for toggling between the selected image item and the image item with the preferred editing option applied may be generated for display in the user interface of the editing application. First and second user interface elements may be generated for display in the user interface of the editing application. The first user interface element may be associated with accepting the edits to the image item, and the second user interface element may be associated with rejecting the edits to the image item. The edited image item may be saved with the original image item as a combined image item in response to receiving a user input associated with the first user interface element. The edits to the image item may be rejected in response to receiving a user input associated with the second user interface element.

A plurality of historic editing actions, each editing action associated with a particular image item of one or more image items, may be transmitted from the computing device to a server, and the preferred editing option to apply to the image item may be received at the computing device and from the server. The preferred editing option may be stored in association with the user profile.

It may be identified that the image item was captured with the computing device, via metadata associated with the image item. The preferred editing option may be identified in response to identifying that the image item was captured with the computing device.

Input associated with saving the image item may be received, and one or more display settings associated with a display of the computing device may be identified. It may be identified that a display setting impacts how the image item is output at the display of the computing device, and a representation of the display setting may be stored in a data file. The image item may be associated with the data file, and the associated image item and the data file may be saved. In another example, the representation of the display setting, or settings, may be saved as part of an image file metadata, in the same file as the image item.

The image item may comprise a high-quality image and a plurality of associated lower-quality images. Identifying the preferred editing option may further comprise identifying the high-quality image and identifying a preferred editing option to apply to the high-quality image.

The image item may comprise a high-quality image and a plurality of associated lower-quality images. Identifying the preferred editing option may further comprise identifying an image from the plurality of associated lower-quality images, and improving, via a trained machine learning algorithm, the quality of the identified lower-quality image. Input associated with saving the image item may be received, and one or more parameters associated with the trained machine learning algorithm may be identified. A representation of the parameter, or parameters, may be stored in a data file, and the image item may be associated with the data file. The associated image item and the data file may be saved. In another example, the representation of the parameters may be saved as part of an image file metadata, in the same file as the image item.

The plurality of lower-quality images may comprise reference images and images that refer to the reference images. Identifying the preferred editing option may further comprise identifying that one of the plurality of associated lower-quality images is an anchor image, or a reference image, and using the reference frame as an input to the trained machine learning algorithm for improving the quality of the identified lower-quality image. In some examples, the reference image may be a key frame, or an anchor frame.

BRIEF DESCRIPTIONS OF THE DRAWINGS

The present disclosure, in accordance with one or more various embodiments, is described in detail with reference to the following figures. The drawings are provided for purposes of illustration only and merely depict typical or example embodiments. These drawings are provided to facilitate an understanding of the concepts disclosed herein and shall not be considered limiting of the breadth, scope, or applicability of these concepts. It should be noted that for clarity and ease of illustration these drawings are not necessarily made to scale.

The above and other objects and advantages of the disclosure may be apparent upon consideration of the following detailed description, taken in conjunction with the accompanying drawings, in which.

DETAILED DESCRIPTION

Figure 1:
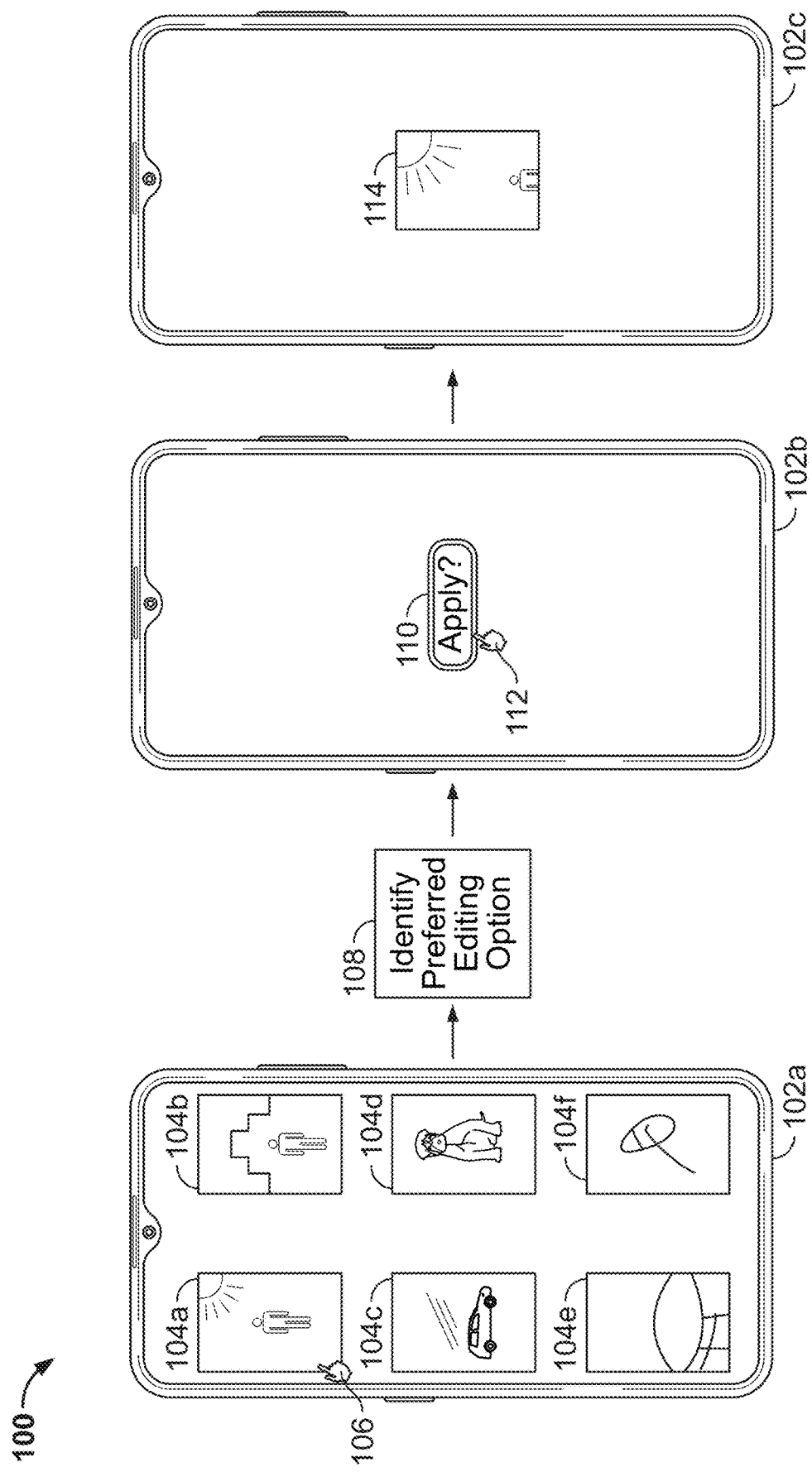
FIG. 1 shows an example environment for enabling improved image editing at a computing device, in accordance with some embodiments of the disclosure.

Where the examples and embodiments refer to an image item herein, the image item may be a content item. A content item includes an image item, but also includes audio, video, text, multimedia, a video game, a screen share and/or any other media content. A content item may be a single media item. In other examples, it may be a series (or season) of episodes of content items. Audio includes audio-only content, such as podcasts. Video includes audiovisual content such as movies and/or television programs. Text includes text-only content, such as event descriptions. An over-the-top (OTT), streaming and/or video-on-demand (VOD) service (or platform) may be accessed via a website and/or an app running on a computing device, and the device may receive any type of content item, including live content items and/or on-demand content items. Content items may, for example, be streamed to physical computing devices. In another example, content items may, for example, be streamed to virtual computing devices in, for example, an augmented environment, a virtual environment and/or the metaverse. An image item may be any suitable image. It may comprise a compressed image, or an uncompressed image. It may be an image stored in a known file format, such as a JPEG, PNG or TIFF. An image item may comprise a plurality of images stored in a single file, such as a GIF or HEIF. In some examples, an image item may be a proprietary file format. An image item may comprise, for example, a Live Photo.

A preferred editing option may comprise any editing that can be applied to an image item. A preferred editing option may comprise one or more of the following: adjusting the color of an image, adjusting the sharpness of the image, adjusting the contrast of the image, adjusting the saturation of the image, cropping the image, rotating the image, applying an effect to the image and/or applying a filter to the image. The preferred editing option may be identified via a user profile and may be based on historic editing actions for a plurality of different image items.

An icon is a generic term intended to cover a variety of user elements. An icon may comprise an image and/or text. An icon may be a button and/or a toggle. A user may interact with an icon by selecting it, rotating it, toggling it, dragging it, selecting it for a threshold period of time and/or any other known way of interacting with a user interface element. An icon may be of any size. An icon may be associated with a single image item. In another example, an icon may be associated with a plurality of image items. In some examples, a plurality of icons may be utilized, with a different icon being assigned to a separate action. In other examples, one or more icons may be utilized to perform multiple actions. In a further example, the look of an icon may be updated in order to indicate different actions that may be performed with that icon.

The disclosed methods and systems may be implemented on one or more computing devices. As referred to herein, the computing device can be any device comprising a processor and memory, for example, a television, a smart television, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a handheld computer, a stationary telephone, a personal digital assistant (PDA), a mobile telephone, a portable video player, a portable music player, a portable gaming machine, a smartphone, a smartwatch, a smart speaker, an augmented reality headset, a mixed reality device, a virtual reality device, a gaming console, or any other television equipment, computing equipment, or wireless device, and/or combination of the same.

The methods and/or any instructions for performing any of the embodiments discussed herein may be encoded on computer-readable media. Computer-readable media includes any media capable of storing data. The computer-readable media may be transitory, including, but not limited to, propagating electrical or electromagnetic signals, or may be non-transitory, including, but not limited to, volatile and non-volatile computer memory or storage devices such as a hard disk, floppy disk, USB drive, DVD, CD, media cards, register memory, processor caches, random access memory (RAM), etc.

FIG. 1 shows an example environment for enabling improved image editing at a computing device, in accordance with some embodiments of the disclosure. The environment 100 comprises a computing device, in this example smartphone 102 (102a, 102b, 102c are different views in time of the same smartphone 102). Smartphone 102a generates a selection of image items 104a, 104b, 104c, 104d, 104e, 104f for display. The image items 104a, 104b, 104c, 104d, 104e, 104f may be stored locally at a non-volatile memory of the smartphone 102. In another example, the image items 104a, 104b, 104c, 104d, 104e, 104f may be stored remotely from the smartphone and may be accessible via, for example, an internet-connected server. In some examples, the image items 104a, 104b, 104c, 104d, 104e, 104f may be stored both locally and on the server, or a mix of locally and on the server. A user provides user input 106, via a user interface, for selecting an image item for editing, in this example, image item 104a, at the smartphone 102a. In other examples, a user may select a plurality of the image items 104a, 104b, 104c, 104d, 104e, 104f, and the preferred editing option (as discussed below) may be applied to the plurality of selected image items.

In response to the user selecting an image item, a preferred editing option is identified 108. For example, a preferred editing option may comprise one or more of the following: adjusting the color of an image, cropping the image, rotating the image, applying an effect to the image and/or applying a filter to the image. The preferred editing option may be identified via a user profile and may be based on historic editing actions for a plurality of different image items. For example, if a user profile indicates that a sepia filter is usually applied to an image (or a portion of an image) of a certain brightness, and it is identified that the selected image (or portion thereof) is of that certain brightness, then a sepia filter may be identified as the preferred editing option 108. In another example, a preferred editing option may be applied to a genre of image items, for example, "holiday snaps." An icon 110 for applying the preferred editing option 108 is generated and is output at a display of the smartphone 102b. The icon may be displayed as an overlay with respect to the selected image item 104a. In another example, the icon may be displayed in a first portion of the display, and the image item 104a may be displayed in a second portion of the display. In a further example, the image item 104a may be temporarily hidden while the icon 110 is displayed. User input 112 associated with the icon 110 is received. On receiving the input 112, the preferred editing option is applied to the image item 104a to produce an edited image item 114.

The historic editing actions that are accessed via a user profile may reflect a user that has a strong subjective preference for one or more particular editing options when editing image items. Such a user may make edits with respect to, for example, colors, contrast and/or sharpness that exhibit a relatively high degree of similarity. The user may also wish to avoid making typically time-consuming manual adjustments, through editing, to a large set of image items. In another example, the user may wish to have edits applied automatically to newly captured image items. The environment 100, and the environments discussed below enable a user to automatically create predictable, desirable edits to, for example, new image items that are captured on a computing device.

In some examples, a preferred editing option may be based on a genre of image item, for example, through the categorization of a plurality of image items. In a more specific example, the adjustment and enhancement applied to faces and skin tone may be identified, which generally appear to be more sensitive to undesirable enhancement by saturation adjustments and hue shifts, for example.

The historic actions discussed herein may be learned and optimized by a trained machine learning algorithm, for example, as a combination of all the possible editing choices supported by an image item application. For example, cascaded processing from multiple adjustments, such as changing the sharpness, contrast, tint and/or brightness of an image item, can be learned and customized together.

In some examples, editing options may be categorized by geometric changes, such as reframing by cropping and rotation and/or tilting. The combined editing effect may then be previewed or reviewed, assisted by a single button for toggling to compare before and after editing, for example, as discussed in connection with FIG. 3 below.

In some examples, a preferred editing option may not be applied twice. In some examples, a preferred editing option may be applied only to those image items that do not already have any edits saved and/or edits applied to them. In order to maintain the consistency of user preferences, an identified preferred option may be based on a particular computing device, and may be applied only to image items captured with that particular computing device. For example, image items captured on a mobile computing device may include appropriate metadata that can be used to identify the source of a photo. In some examples, when the origin of an image item is in question, or is not recognizable, no preferred editing option may be applied. Not applying an editing option where the origin of the image item is uncertain may prevent preferred editing options from being applied to image items that are received from another user and saved in an album, for example.

Figure 2:
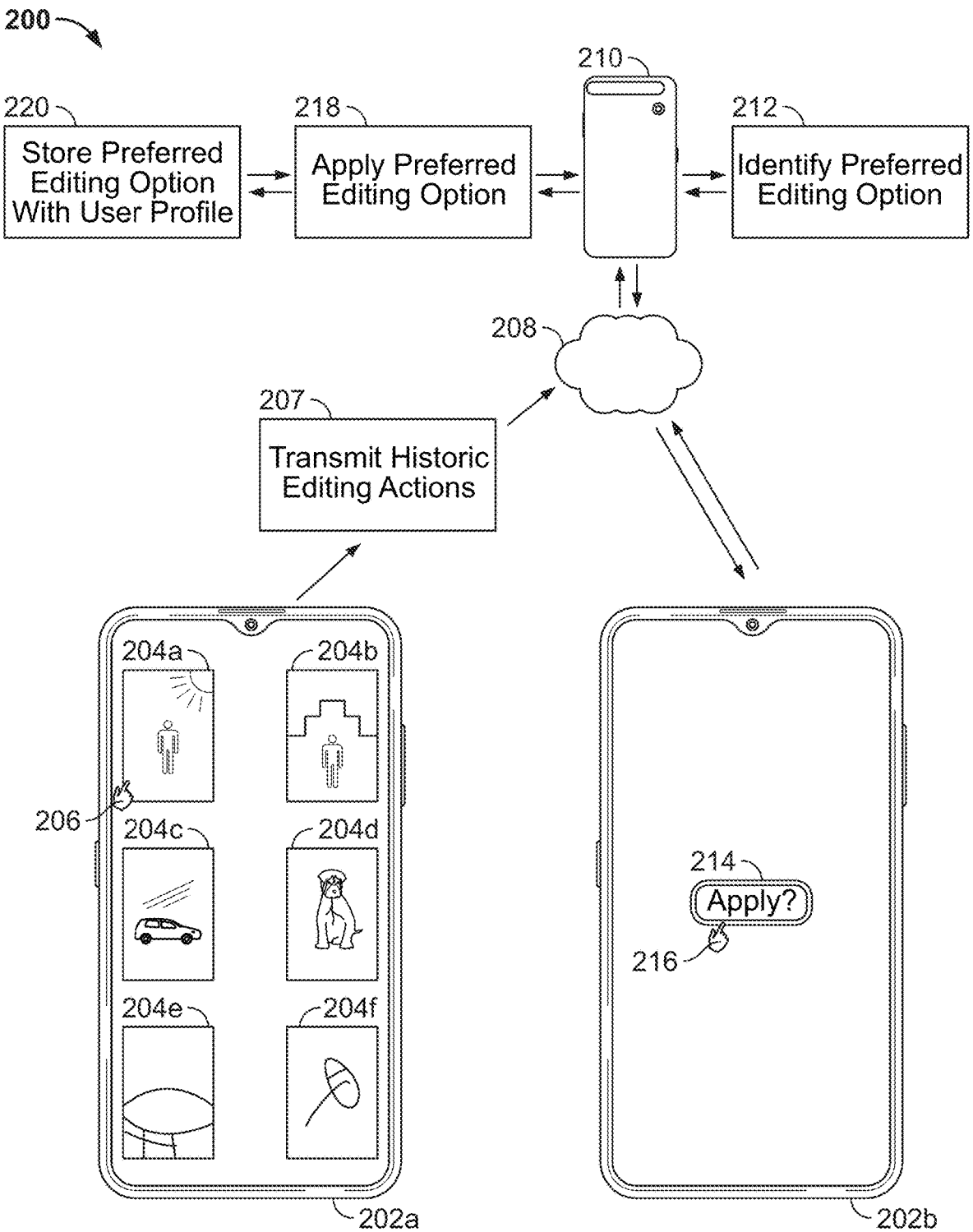
FIG. 2 shows another example environment for enabling improved image editing at a computing device, in accordance with some embodiments of the disclosure.

FIG. 2 shows another example environment for enabling improved image editing at a computing device, in accordance with some embodiments of the disclosure. In a similar manner to the environment 100 shown in FIG. 1, the environment 200 comprises a computing device, in this example smartphone 202 (202a, 202b are different views in time of the same smartphone 202), a network 208 and a server 210. Smartphone 102a generates a selection of image items 204a, 204b, 204c, 204d, 204e, 204f for display. The image items 204a, 204b, 204c, 204d, 204e, 204f may be stored locally at a non-volatile memory of the smartphone 202. In another example, the image items 204a, 204b, 204c, 204d, 204e, 204f may be stored remote from the smartphone and may be accessible via, for example, the network 208. The network may be any network, including the internet, and may comprise wired and/or wireless means. In some examples, the image items 204a, 204b, 204c, 204d, 204e, 204f may be stored both locally and on the server, or a mix of locally and on the server. A user provides user input 206, via a user interface, for selecting an image item for editing, in this example, image item 204a, at the smartphone 202a. In other examples, a user may select a plurality of the image items 204a, 204b, 204c, 204d, 204e, 204f, and the preferred editing option (as discussed below) may be applied to the plurality of selected image items.

In response to the user selecting an image item 204a, the selected image item 204a, along with historic editing actions 207, are transmitted via network 208 to the server 210, where a preferred editing option is identified 212 based on the transmitted historic editing actions 207. In some examples, the received historic editing actions 207 may be stored at the server 210, for example, associated with a user profile, and the historic editing actions 207 may subsequently be accessed at the server. An indication that a preferred editing option has been identified is transmitted to the smartphone 202b, where an icon 214 for applying the preferred editing option 212 is generated and is output at a display of the smartphone 202b. User input 216 associated with the icon 214 is received. On receiving the input 216, an indication is transmitted to the server 210, where the preferred editing option is applied 218 to the image item 204a. If the image item 204a is not already stored at the server 210, the image item 204a may be transmitted to the server 210, via the network 208, at this stage. The edited image may then be stored at the server 210. In some examples, the edited image may be transmitted, via network 208, to the smartphone 202, for display. The preferred editing option that was identified at 212 is stored 220 at the server 210.

Identifying and applying a preferred editing option can also be extended to server-based processing, for example, as discussed in connection with FIG. 2 above. Such server-based processing may be especially useful in the case of a user archiving a large set of image items online. Server-based processing may also leverage the computational capability that a service may offer, which may be greater than that of a local computing device. Utilizing the greater processing power of a server may enable more advanced editing options to be applied to image items, compared to on a local computing device.

Figure 3:
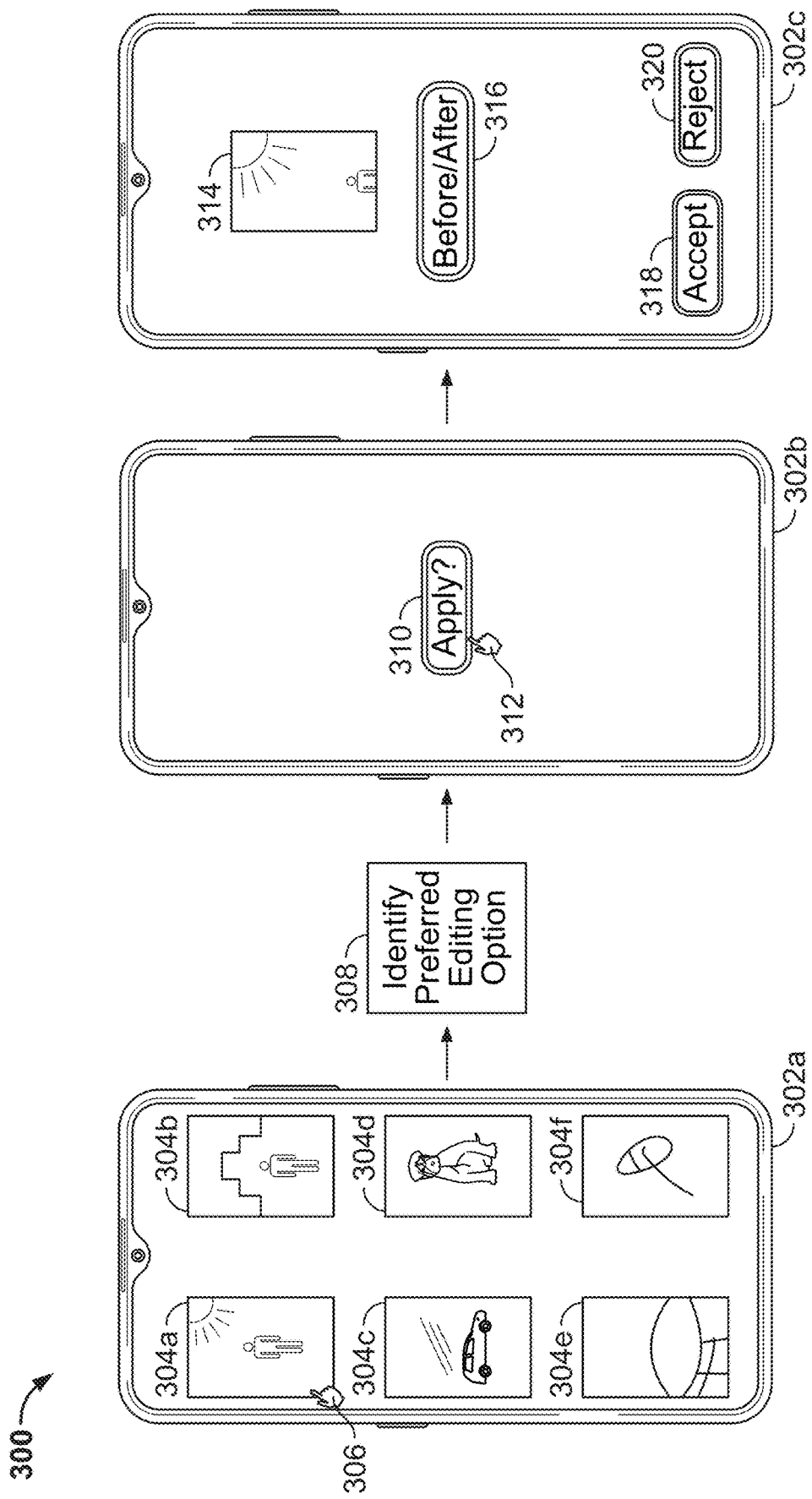
FIG. 3 shows another example environment for enabling improved image editing at a computing device, in accordance with some embodiments of the disclosure.

FIG. 3 shows another example environment for enabling improved image editing at a computing device, in accordance with some embodiments of the disclosure. In a similar manner to the environments 100, 200 shown in FIGS. 1 and 2, the environment 300 comprises a computing device, in this example smartphone 302 (302a, 302b, 302c are different views in time of the same smartphone 302). Smartphone 302a generates a selection of image items 304a, 304b, 304c, 304d, 304e, 304f for display. Again, the image items 304a, 304b, 304c, 304d, 304e, 304f may be stored locally at a non-volatile memory of the smartphone 302. In another example, the image items 304a, 304b, 304c, 304d, 304e, 304f may be stored remotely from the smartphone and may be accessible via, for example, an internet-connected server. In some examples, the image items 304a, 304b, 304c, 304d, 304e, 304f may be stored both locally and on the server, or a mix of locally and on the server. A user provides user input 306, via a user interface, for selecting an image item for editing, in this example, image item 304a, at the smartphone 302a. In other examples, a user may select a plurality of the image items 304a, 304b, 304c, 304d, 304e, 304f, and the preferred editing option (as discussed below) may be applied to the plurality of selected image items.

In response to the user selecting an image item, a preferred editing option is identified 308. The preferred editing option may be identified via a user profile and may be based on historic editing actions for a plurality of different image items. An icon 310 for applying the preferred editing option 308 is generated and is output at a display of the smartphone 302b. User input 312 associated with the icon 310 is received. On receiving the input 312, the preferred editing option is applied to the image item 304a to produce an edited image item 314. User interface elements 316, 318, 320 are also generated for output. A "Before/After" user interface element 316 enables a user to easily view how the edited image item 314 looks with respect to the original image item 304a. On receiving input with the "Before/After" user interface element, the original image item 304a is shown in place of, or side-by-side with, the edited image item 314. In some examples, a view of the original image item 304a or a preview of the edited image item 314 may be displayed via a secondary window that enables a user to evaluate the editing effects on the original image item 304a. An "Accept" user interface element 318 enables a user to accept the edits made to the image item 304a. In this example, edited image item 314 may be saved in response to a user input received at the "Accept" user interface element 318. A "Reject" user interface element 320 enables a user to reject the edits made to the image item 304a. In this example, on receiving user input associated with the "Reject" user interface element 320, the edits that were made to the image item 304a are reverted and the original image item 304a is restored and optionally displayed at the smartphone 302c.

Figure 4:
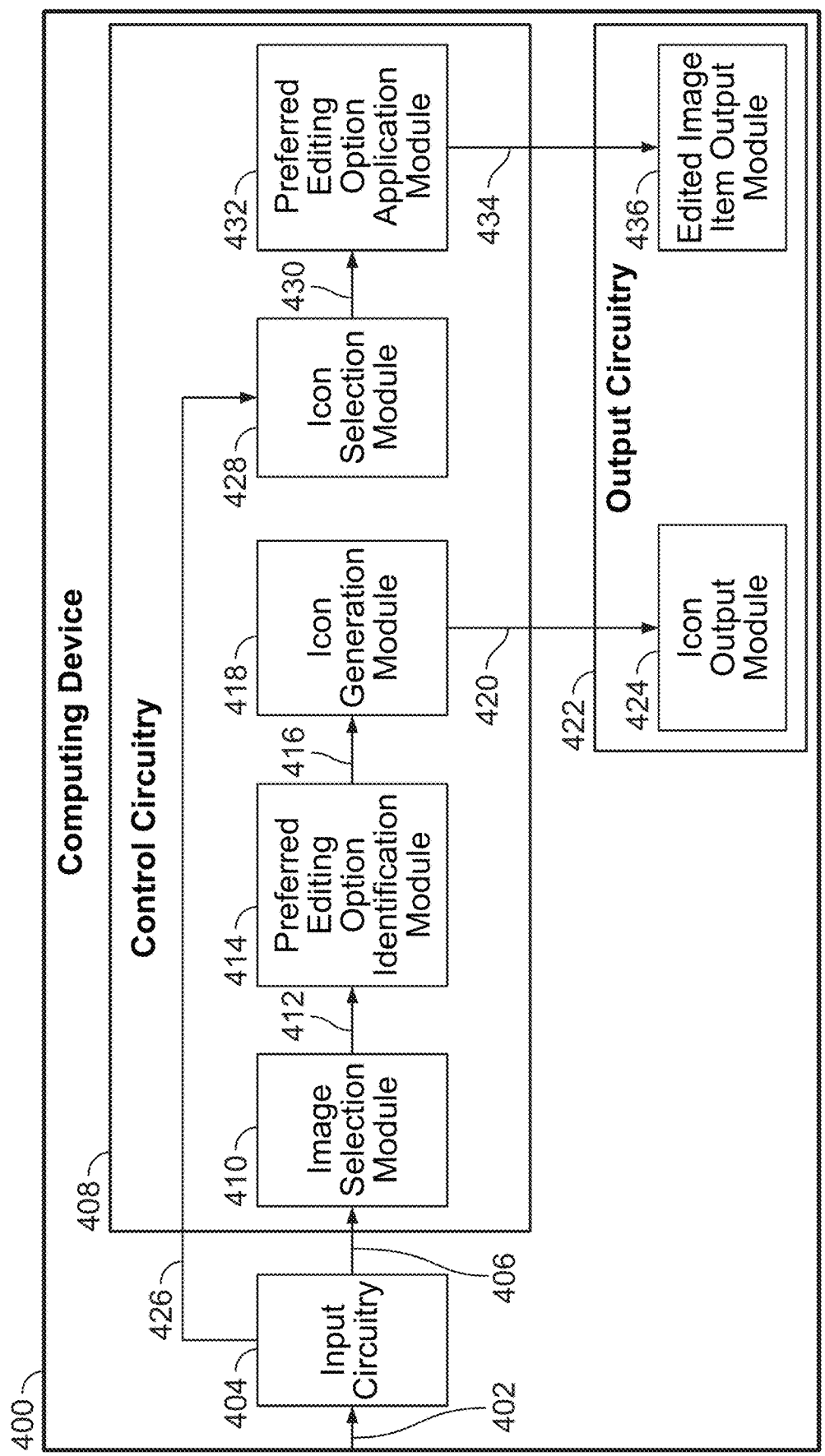
FIG. 4 shows a block diagram representing components of a computing device and dataflow therebetween for enabling improved image editing, in accordance with some embodiments of the disclosure.

FIG. 4 shows a block diagram representing components of a computing device and dataflow therebetween for enabling improved image editing, in accordance with some embodiments of the disclosure. Computing device 400 (e.g., computing devices 102, 202, 302) comprises input circuitry 404, control circuitry 408 and output circuitry 422. Control circuitry 408 may be based on any suitable processing circuitry (not shown) and comprises control circuits and memory circuits, which may be disposed on a single integrated circuit or may be discrete components and processing circuitry. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores). In some embodiments, processing circuitry may be distributed across multiple separate processors or processing units, for example, multiple of the same type of processing units (e.g., two Intel Core i9 processors) or multiple different processors (e.g., an Intel Core i5 processor and an Intel Core i7 processor) and/or a system on a chip (e.g., a Qualcomm Snapdragon 888). Some control circuits may be implemented in hardware, firmware, or software.

Input is received 402 by the input circuitry 404. The input circuitry 402 is configured to receive inputs related to a computing device. For example, this may be via a touchscreen, a Bluetooth and/or Wi-Fi controller of the computing device 400, an infrared controller, a keyboard, a mouse and/or a microphone. In other examples, this may be via gesture detected via an extended reality device. In another example, the input may comprise instructions received via another computing device. The input circuitry 404 transmits 406 the user input to the control circuitry 408.

The control circuitry 408 comprises an image selection module 410, a preferred editing option identification module 414, an icon generation module 418, an icon selection module 428 and a preferred editing option application module 432. The output circuitry 422 comprises an icon output module 424 and an edited image item output module 436. The input is transmitted 406 to the image selection module 410, where an image is selected. On selection of an image, a indication of the selected image is transmitted 412 to the preferred editing option identification module 414. At the preferred editing option identification module 414, a preferred editing option is identified. An indication that a preferred editing option has been identified is transmitted 416 to the icon generation module 418. At the icon generation module 418, an icon is generated for output. In some examples, the icon may be a preset icon, i.e., the same icon is always generated for output. In other examples, an icon may be generated for output based on the identified editing option. On generating an icon, a representation of the generated icon is transmitted 420 to the output circuitry 422, where it is generated for output by the icon output module 424. Input associated with the icon is received by the input circuitry 404 and is transmitted 426 to the icon selection module 428. The icon selection module 428 transmits 430 an indication of the received input to the preferred editing option application module 432, where the preferred editing option is applied to the selected image. The edited image is transmitted 434 to the output circuitry 422, where it is generated for output by the edited image item output module 436.

Figure 5:
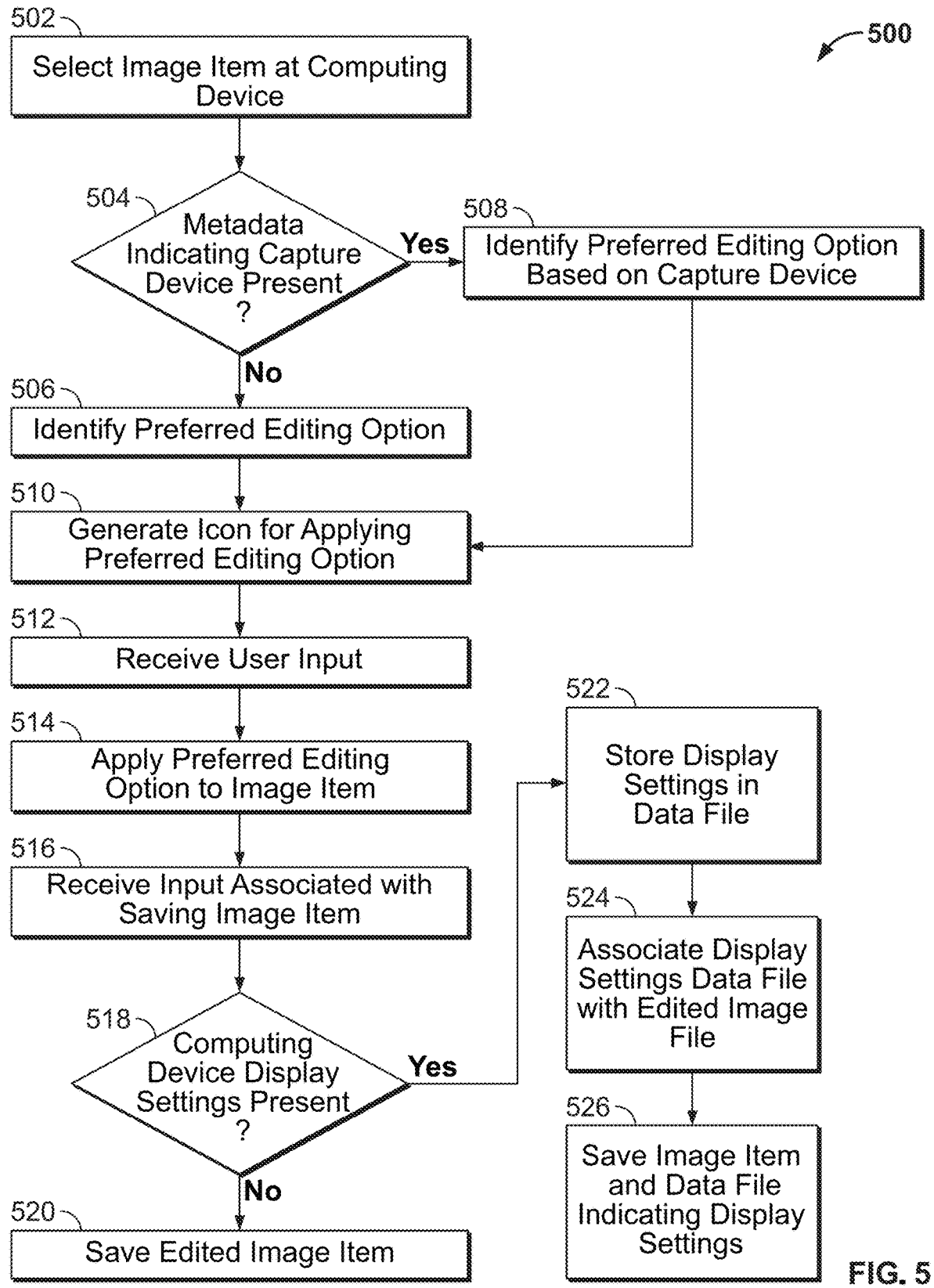
FIG. 5 shows a flowchart of illustrative steps involved in enabling improved image editing at a computing device, in accordance with some embodiments of the disclosure.

FIG. 5 shows a flowchart of an example process 500 including illustrative steps involved in enabling improved image editing at a computing device, in accordance with some embodiments of the disclosure. Process 500 may be implemented, in whole or in part, on any of the aforementioned computing devices (e.g., computing devices 102, 202, 302, e.g., by way of executing one or more instructions or routines stored in the memory or storage of a device). In addition, one or more actions of the process 500 may be incorporated into or combined with one or more actions of any other process or embodiments described herein.

At 502, an image item is selected at a computing device, and at 504, it is determined whether metadata is present that indicates the capture device that took the image. If such metadata is not present, the process proceeds to step 506, where a preferred editing option to apply to the image item is identified, for example, based on historic editing actions for a plurality of different image items and via a user profile. If such metadata is present, the process proceeds to step 508, where a preferred editing option is identified based on the capture device that took the image. For example, an image taken by a front camera of a smartphone may have different characteristics than an image taken by a back camera of a smartphone. The differences between the front camera and the back camera of the smartphone may make it appropriate to select different editing options for images taken by the respective front and back cameras. From step 506, or step 508, the process proceeds to step 510, where an icon for applying the preferred editing option is generated for output.

At 512, user input associated with selecting the icon is received, and at 514, the preferred editing option is applied to the image item that was selected at step 502. At 516, input associated with saving the edited image item is received, and at 518, it is determined whether display settings associated with the computing device are present. If display settings are not present, the process proceeds to step 520, where the edited image item is saved. If display settings are present, the process proceeds to step 522, where the display settings are stored in a data file. At 524, the display settings data file is associated with the edited image item file, and at 526, the image item file and the data file indicating the display settings are saved, for example, to non-volatile memory of the computing device, and/or via a network such as the internet to non-volatile memory of a server. By associating the display settings with the image item file, subsequent computing devices that access the image item file can also access the display settings and, if supported, can alter the output of the image item file to replicate, or closer replicate, the output of the image item file at the original computing device on which it was edited.

Figure 6:
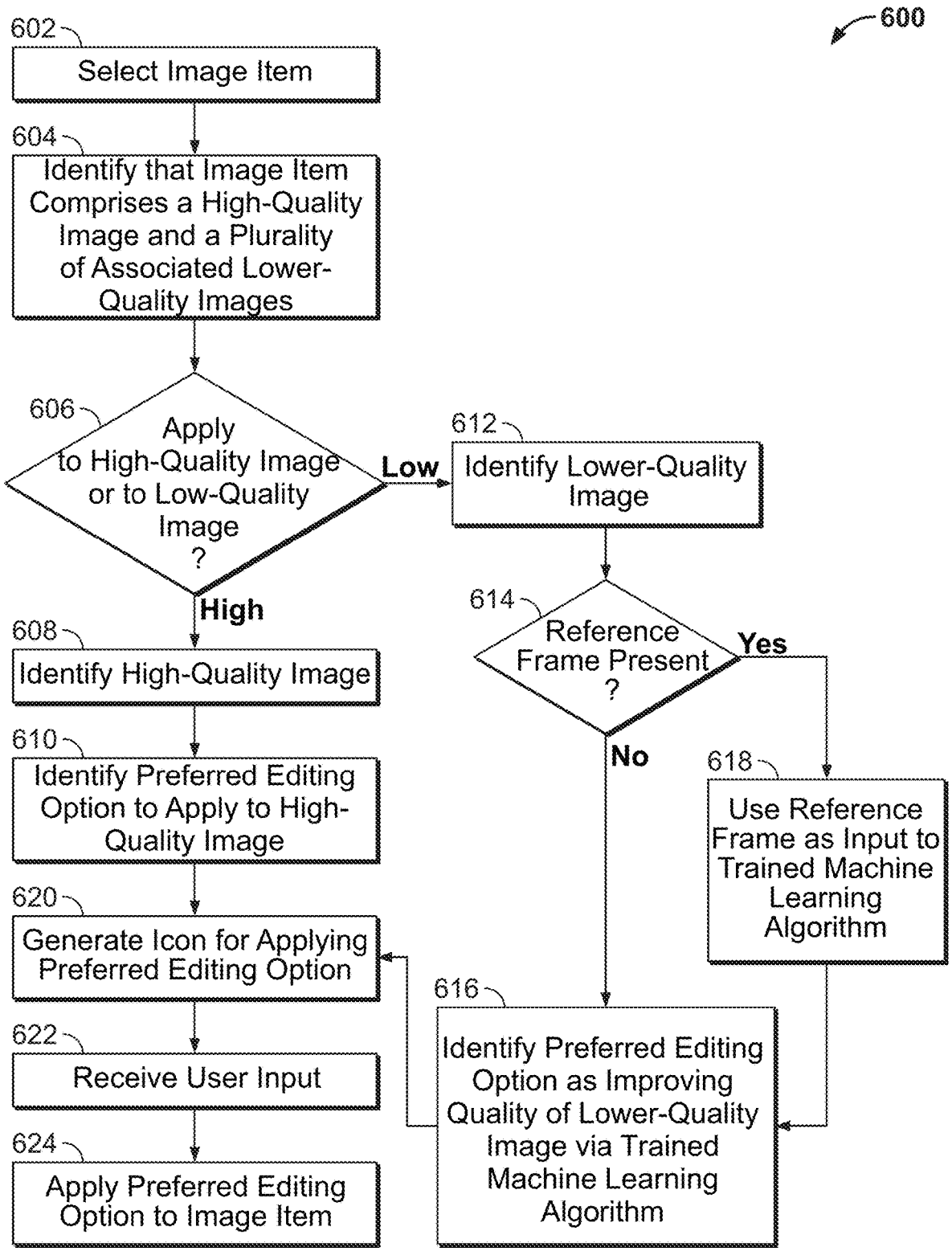
FIG. 6 shows another flowchart of illustrative steps involved in enabling improved image editing at a computing device, in accordance with some embodiments of the disclosure.

FIG. 6 shows another flowchart of an example process 600 including illustrative steps involved in enabling improved image editing at a computing device, in accordance with some embodiments of the disclosure. Process 600 may be implemented, in whole or in part, on any of the aforementioned computing devices (e.g., computing devices 102, 202, 302, e.g., by way of executing one or more instructions or routines stored in the memory or storage of a device). In addition, one or more actions of the process 600 may be incorporated into or combined with one or more actions of any other process or embodiments described herein.

At 602, an image item is selected at a computing device, and at 604, it is identified that the image item comprises one or more high-quality images and one or more associated relatively lower-quality images. At 606, it is determined whether the preferred editing option is to be applied to one or more of the high-quality images of the image item, or to one or more of the associated lower-quality images. If the preferred editing option is to be applied to the high-quality image of the image item, then the process proceeds to step 608, where the high-quality image is identified. At 610, a preferred image editing option to apply to the high-quality image is identified.

If, at 606, it is determined that the preferred editing option is to be applied to one or more of the plurality of associated lower-quality images, then the process proceeds to step 612. At 612, at least one of the relatively lower-quality images is identified. At step 614, it is determined whether a key frame, anchor frame, or reference frame is present in the plurality of lower-quality images. If a reference frame is not present, then the process proceeds to step 616, where the preferred editing option is identified as improving the quality of a relatively lower-quality image via a trained machine learning algorithm. If, at 614, it is determined that a reference frame is present in the plurality of lower-quality images, then the process proceeds to step 618. At 618, a reference frame is used as an input to a trained machine learning algorithm, and the process proceeds to step 616, wherein the trained machine algorithm of step 618 is utilized.

The process proceeds from step 610, or step 616, to step 620, where an icon for applying the preferred editing option is generated for output. At 622, user input associated with selecting the icon is received, and at 624, the preferred editing option is applied to the image item that was selected at step 602.

Figure 7:
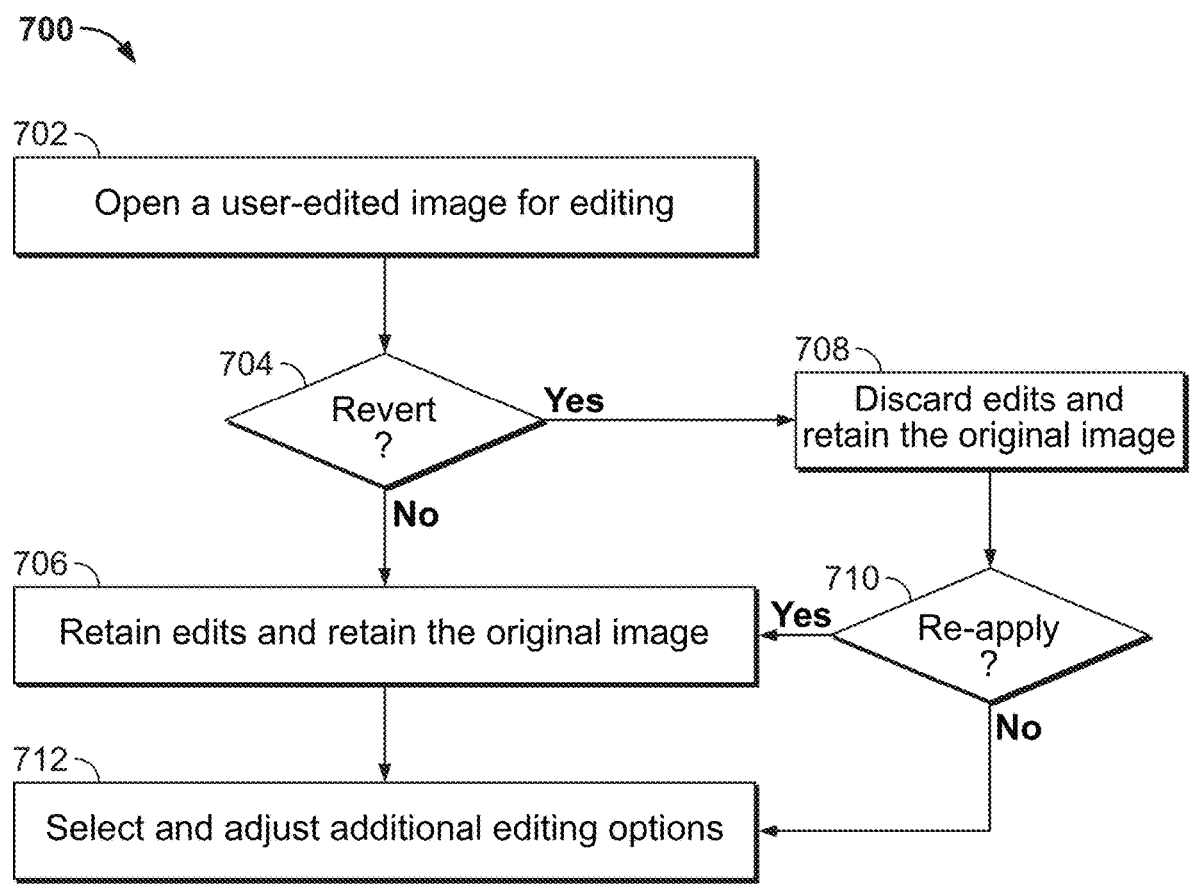
FIG. 7 shows another flowchart of illustrative steps involved in enabling improved image editing at a computing device, in accordance with some embodiments of the disclosure.

FIG. 7 shows another flowchart of an example process 700 including illustrative steps involved in enabling improved image editing at a computing device, in accordance with some embodiments of the disclosure. Process 700 may be implemented, in whole or in part, on any of the aforementioned computing devices (e.g., computing devices 102, 202, 302, e.g., by way of executing one or more instructions or routines stored in the memory or storage of a device). In addition, one or more actions of the process 700 may be incorporated into or combined with one or more actions of any other process or embodiments described herein.

At 702, a user-edited image is opened for editing at a computing device. In this example, the original image item is saved separately from the edited image item, which enables image edits to be reverted in response to, for example, a user request. In some examples, a history of the edits may be saved separately as well. At 704, it is determined whether the edits to the user-edited image should be reverted, for example, in response to a user input received at a user interface of an image editing application. If it is determined that the edits should not be reverted, then, at 706, a history of the edits is retained along with the original image. If it is determined that the edits should be reverted then, at 708, the edits are discarded, and the original image item is retained. The process proceeds to step 710, where it is determined whether the edits to the image should be re-applied. If it is determined that the edits should be re-applied, then the process proceeds to step 706, as described above. The process proceeds from step 706, or, if it is determined that the edits should not be re-applied at step 710, from step 710, to step 712. At step 712, one or more editing options for applying to an image item are selected and/or adjusted, which are then applied to the original image item, and an edited image is saved separately from the original image item. In some examples, a history of the edits may be saved separately as well.

Process 700 enables edits to an image item to be preserved. The "re-apply" option at step 710 may comprise a toggling operation that enables a user to toggle between the original image item and the user-edited image item. In another example, an icon may enable a preview of one of the original or edited images to be displayed in a secondary window at the computing device. The secondary window may display or show either the original image item or the user-edited image item. In addition, the images in a primary window and the secondary window may be switched as the user desires in the editing and review process.

Figure 8:
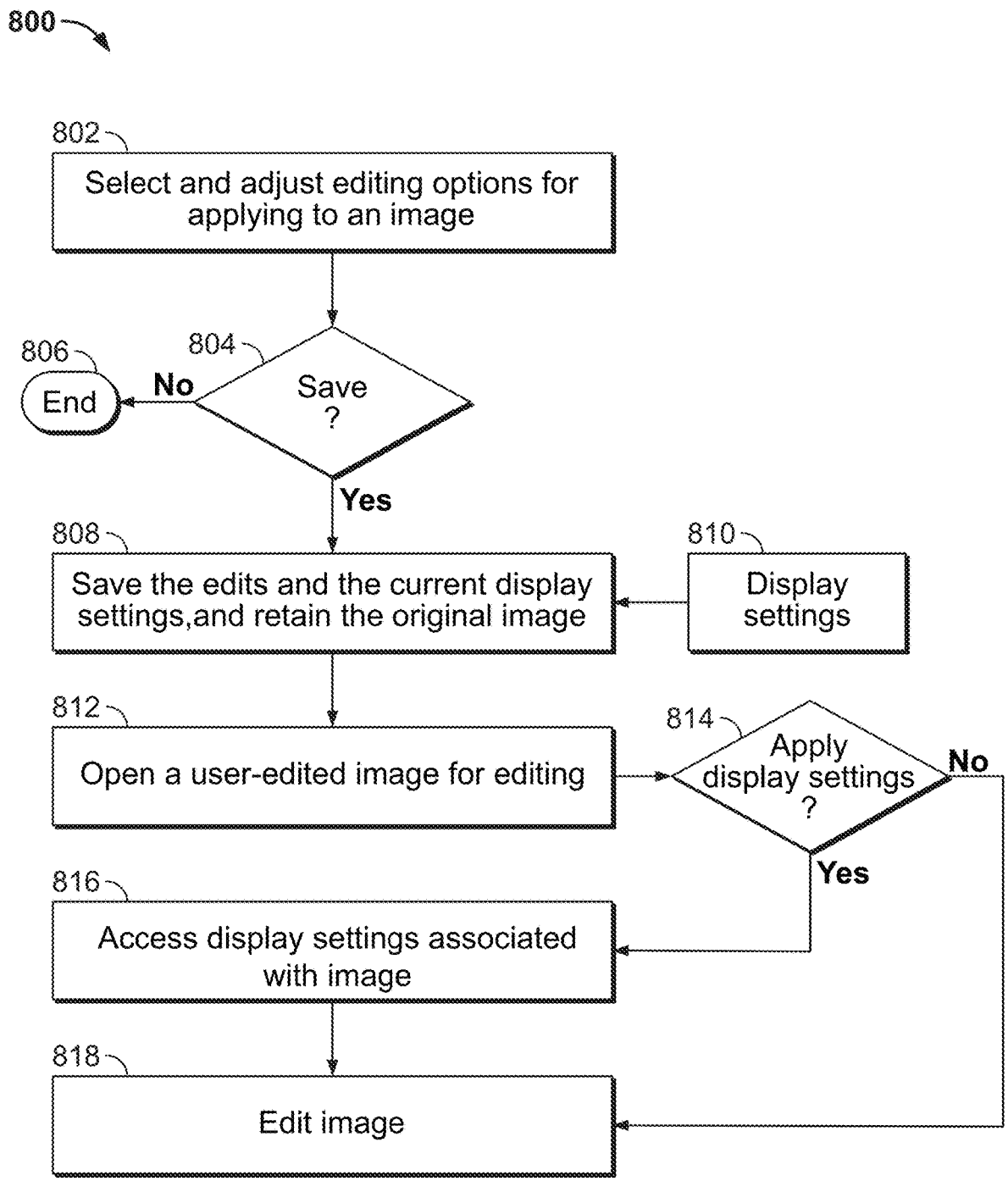
FIG. 8 shows another flowchart of illustrative steps involved in enabling improved image editing at a computing device, in accordance with some embodiments of the disclosure.

FIG. 8 shows another flowchart of an example process 800 including illustrative steps involved in enabling improved image editing at a computing device, in accordance with some embodiments of the disclosure. Process 800 may be implemented, in whole or in part, on any of the aforementioned computing devices (e.g., computing devices 102, 202, 302, e.g., by way of executing one or more instructions or routines stored in the memory or storage of a device). In addition, one or more actions of the process 800 may be incorporated into or combined with one or more actions of any other process or embodiments described herein.

It may be desirable to record display settings, for example, as metadata to improve consistency in content creation and rendering. It is recognized that an image may look different on different displays, not least on different displays applying different settings to the output. For example, the brightness on the display of a smartphone can be easily manipulated by a user and/or by the smartphone itself in response to ambient lighting. When a user edits an image at a computing device, the display settings that are applied to a display may be known. When the same image is shared from a first computing device and is shown on a second computing device, it is possible to have the display settings on the second computing device be altered to be the same as, or close to, those of the first computing device. Changing the display settings in this manner enables the perception of a same image to be more consistent. This is also applicable when, for example, a user re-opens an image for editing on the same computing device if the display settings have been changed.

The process 800 enables the capability of a computing device, such as a smartphone, to be leveraged in terms of automatically adjusting the display brightness and/or the color temperature settings. For example, a user may have the display brightness of the smartphone set to 50%, with a warm color temperature on the smartphone. An image item editing application may record such settings along with any edits made to an image item when the image item is saved to a memory of computing device. Subsequently, when the user opens the photo on the same computing device, or a different computing device, the computing device may automatically adjust a display to similar settings, as when the image item was saved, so that the user may experience a relatively consistent look of the photo.

In some examples, the setting of a display brightness may correspond a relative number or a percentage, e.g., 0-100%, of the peak display brightness. As different displays may have different capabilities, it may be preferable to record, or store, the display brightness in an absolute manner, for example, measuring and recording the brightness in terms of nits, or $cd/m^2$. Using an absolute manner may improve consistency preservation across various display types and different peak brightness capabilities of different displays.

In some examples, the display of a computing device may be set to automatically adjust display settings, for example, by auto-brightness and true-tone, which respond to ambient conditions. Such automatic display adjustment options may also be recorded as metadata, so that the adaptation can be consistently applied in different ambient conditions.

Where a user shares an image item, the recipient may have an option to see the intended look of an image item, which has been created and reviewed by the sender. This may be achieved by the application on the receiving computing device to recover, or mimic, the display settings of the computing device on which the image item was edited, in a best effort manner, to alleviate any perceived difference that is caused by discrepancies in display settings between the sending and receiving computing devices.

At 802, one or more editing options for applying to an image item are selected and/or adjusted. At 804, it is determined whether the edited image item should be saved, for example in response to user input received via a user interface of an image editing application. If it is determined that the image item should not be saved, then the process proceeds to step 806, where the process ends. If it is determined that the image item should be saved, then the process proceeds to step 808. At step 808, the display settings of the computing device are received from 810, and any edits made to the image item, the current display settings of the computing device and the original image are retained, or saved, along with the edited image. The display settings may include, for example, a type of display connected to, or integral to, the computing device, such as a liquid-crystal display (LCD) and/or an organic light-emitting diode display (OLED). The display settings may also include, for example, gamut, a minimum and/or maximum brightness, a current brightness, an ambient mode, a color temperature and/or white point of the display.

At 812, the image that was saved at step 808 is subsequently opened for editing at a computing device. At 814, it is determined whether to apply the display settings that were saved with the edited image at 808, for example, in response to accessing a user setting for applying display settings to images for editing. If it is determined that the display settings should be applied to the image, then, at 816, the display settings that are associated with the image are accessed and are applied to the image, and the process proceeds to step 818. At 814, if it is determined that the display settings should not be applied to the image, then the process also proceeds to step 818. At step 818, the image is edited, for example, via user input received via a user interface of an image editing application.

Some image items may comprise a still image and a short video that is recorded for a time period before and/or after the still image. The still image may correspond to a key frame in the image item. An example of such an image item is a "Live Photo." In some examples, the video may be three seconds long, with one and a half seconds of video taking place before the key frame, and one and a half seconds of video taking place after the key frame. In other example, the video may be one, two, five, ten, fifteen or twenty seconds long. In some examples, the video may be divided equally before and after the key frame. In other examples, the video may be divided asymmetrically before and after the key frame. The key frame is typically a higher resolution than the frames that make up the video. In some examples, a user can change the key frame in a live photo through editing. For example, if a person's eyes are shut in the original key frame, a user may choose a different key frame for the image item; however, as the new key frame is based on a video frame, rather than the original still image, this may result in a degradation in picture quality, as the video frames may be captured at a lower resolution. In addition, there may be video compression and inter-frame prediction applied to the video frames, which may also lead to reduced image quality. In some examples, the key frame may be converted from the image item, such as a live photo, and shared with other applications and/or users that do not utilize a compatible platform and/or ecosystem.

Figure 9:
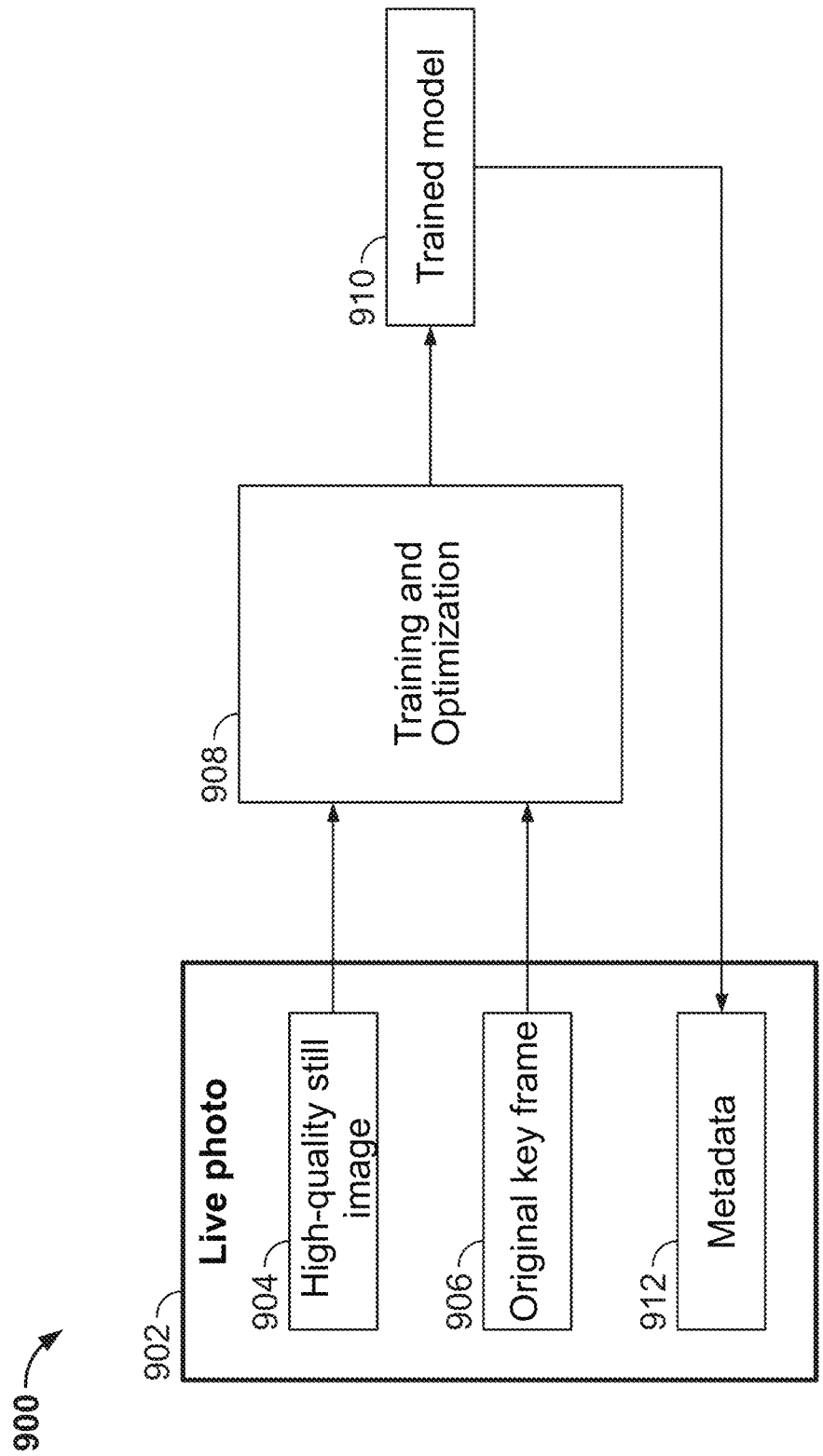
FIG. 9 shows a flowchart of illustrative steps involved in training a machine learning model for enabling improved image editing at a computing device, in accordance with some embodiments of the disclosure.

FIG. 9 shows a flowchart of an example process 900 including illustrative steps involved in training a machine learning model for enabling improved image editing at a computing device, in accordance with some embodiments of the disclosure. Process 900 may be implemented, in whole or in part, on any of the aforementioned computing devices (e.g., computing devices 102, 202, 302, e.g., by way of executing one or more instructions or routines stored to memory or storage of a device). In addition, one or more actions of the process 900 may be incorporated into or combined with one or more actions of any other process or embodiments described herein.

At 902, an image item comprising a live photo is accessed. The live photo comprises a relatively high-quality still image and a plurality of lower-quality images that make up the motion component of the live photo. Typically, the motion component of the live photo is for a fixed period of time before and after a key frame that initially corresponds to the relatively high-quality still image. At 904 a relatively high-quality still image from the live photo, and, at 906, an original key frame from the live photo is provided as inputs to train and optimize model. In some examples, the relatively high-quality still image from the live photo and the original key frame from the live photo may be the same image of the live photo; in other examples, they may be different images of the live photo. At 908, the model is trained and optimized, and at 910, the trained model generates metadata 912 based on the inputs.

In one example, the training can be optimized with the use of an established large database, where image items, such as live photos, can be categorized by genres. This way, the outcome from optimization can be a set of pre-configurations which can be chosen to apply to any image items, such as live photos. In this example, content-based metadata may become a reduced set of genre-based model parameters, which different applications may store, access, and share across different platforms, stored locally and/or on a remote server, such as the cloud. In some image items, such as in a live photo, the still and frames from the video may show different framing and cropping due to the difference in settings, as well as a common format required for video compression; in these cases, image registration may be applied to align the pixels in the training.

Figure 10:
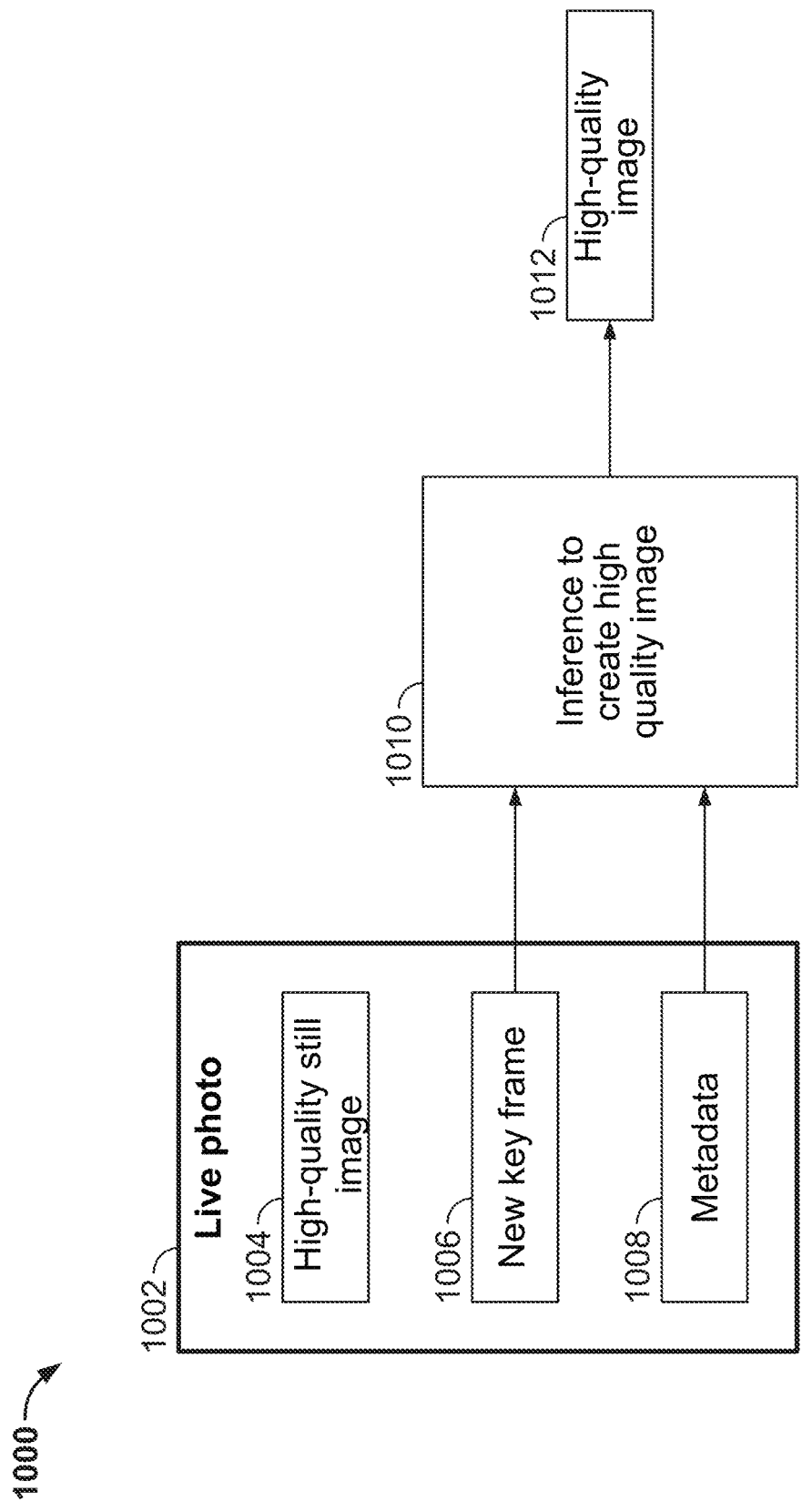
FIG. 10 shows another flowchart of illustrative steps involved in enabling improved image editing at a computing device, in accordance with some embodiments of the disclosure.

FIG. 10 shows another flowchart of an example process 1000 including illustrative steps involved in enabling improved image editing at a computing device, in accordance with some embodiments of the disclosure. Process 1000 may be implemented, in whole or in part, on any of the aforementioned computing devices (e.g., computing devices 102, 202, 302, e.g., by way of executing one or more instructions or routines stored in the memory or storage of a device). In addition, one or more actions of the process 1000 may be incorporated into or combined with one or more actions of any other process or embodiments described herein.

A live photo comprises a relatively high-quality still image and a plurality of lower-quality images that make up the motion component of the live photo. Typically, the motion component of the live photo is for a fixed period of time before and after a key frame, that initially corresponds to the relatively high-quality still image. At 1002, a user selects a new key frame for a live photo, based on one of the relatively low-quality images. The high-quality still image 1004 is retained; however, the trained model uses the selected relatively low-quality image, new key frame 1006, and metadata 1008, such as metadata 912 generated as described in connection with FIG. 9 above, as inputs. At 1010, the trained model uses inference to create a high-quality image, and, at 1012, this generated high-quality image is used as the new key frame.

Resolution improvement may form part of the quality enhancement of lower-quality images. To better optimize the performance of such neural network models, recovery of loss due to the predictive coding in video compression may also be critical. This may first start with the process of input quality equalization to avoid unevenly distributed picture quality in video compression due to, for example, different picture types and different quantization parameter values.

Figure 11:
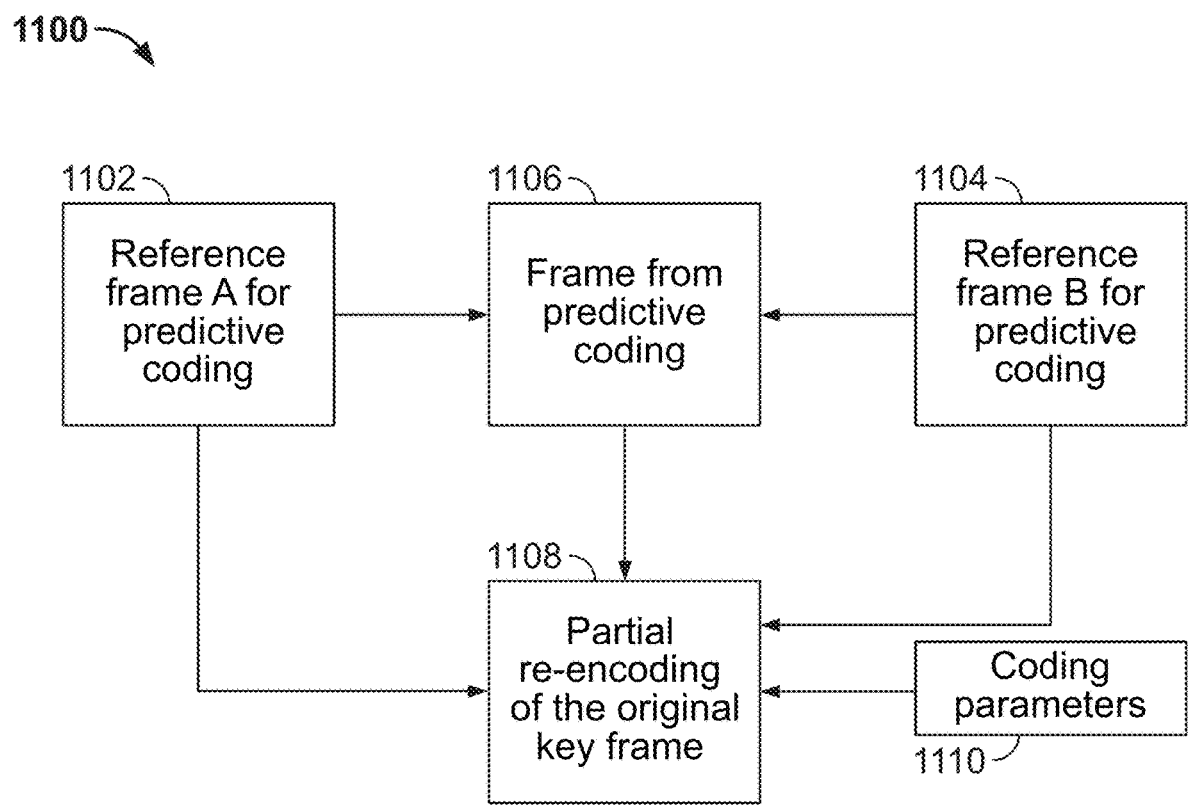
FIG. 11 shows another flowchart of illustrative steps involved in enabling improved image editing at a computing device, in accordance with some embodiments of the disclosure.

FIG. 11 shows another flowchart of an example process 1100 including illustrative steps involved in enabling improved image editing at a computing device, in accordance with some embodiments of the disclosure. Process 1100 may be implemented, in whole or in part, on any of the aforementioned computing devices (e.g., computing devices 102, 202, 302, e.g., by way of executing one or more instructions or routines stored in the memory or storage of a device). In addition, one or more actions of the process 1100 may be incorporated into or combined with one or more actions of any other process or embodiments described herein.

At 1102, a reference frame A for predictive coding is identified, and at 1104 a reference frame B for predictive coding is identified. At 1106, a frame from the predictive coding is identified. At 1108, partial re-encoding of the original reference frame is performed, based on coding parameters accessed at 1110.

The aforementioned reference frame A and reference frame B are not the same frame as the original key frame. The coding parameters in the predictive coding can be extracted from the video stream and then used in the partial re-encoding, as coding parameters 1110. The result of the partial re-encoding is the original key frame that is encoded with inter-prediction and at quantization parameter values set for predictive coding. This may be more representative of the quality of the new key frame and therefore improve the performance of the neural network model that is trained in FIG. 9. In some examples, the partial encoding depicted in FIG. 11 does not have to complete all the processes such as the entropy coding. The purpose of the quality equalization for the original key frame may be focused on generating a more suitable input for the training. This quality equalization may be differentiated for reference and non-reference frames in the video. Typically, a predictive coding reference frame will have a better quality than a non-reference frame. With such differentiation, the models trained can provide further granularity in the optimized parameters. In some examples, a new key frame can be a reference frame or a non-reference frame, and such differentiation can provide more accurate, targeted inferencing performance; there may be multiple optimized neural network models tailor-made for, for example, P and B frames in the video.

The processes described above are intended to be illustrative and not limiting. One skilled in the art would appreciate that the steps of the processes discussed herein may be omitted, modified, combined, and/or rearranged, and any additional steps may be performed without departing from the scope of the disclosure. More generally, the above disclosure is meant to be illustrative and not limiting. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method comprising:
    selecting, at a computing device and with an editing application, an image item comprising a high-quality image and a plurality of associated lower-quality images;
    identifying, via a user profile, a preferred editing option to apply to the image item, wherein the preferred editing option comprises:
        identifying an image from the plurality of associated lower-quality images; and
        improving, via a trained machine learning algorithm, a quality of the identified lower-quality image;
    generating, for display in a user interface of the editing application, an icon for applying the preferred editing option to the image item;
    receiving user input associated with the icon; and
    applying the preferred editing option to the image item.

2. The method of claim 1, wherein:
    selecting the image item further comprises selecting a plurality of image items;
    generating the icon further comprises generating the icon for applying the preferred editing option to the plurality of image items; and
    applying the preferred editing option further comprises applying the preferred editing option to each image item of the plurality of image items.

3. The method of claim 1, further comprising:
    generating, for display in the user interface of the editing application, a second icon for toggling between the selected image item and the image item with the preferred editing option applied;
    generating, for display in the user interface of the editing application, first and second user interface elements, wherein:
        the first user interface element is associated with accepting the edits to the image item; and
        the second user interface element is associated with rejecting the edits to the image item; and
    based on, at least in part, receiving a user input associated with the first user interface element, saving the edited image item with the original image item as a combined image item; or
    based on, at least in part, receiving a user input associated with the second user interface element, rejecting the edits to the image item.

4. The method of claim 1, wherein:
    identifying the preferred editing option further comprises determining the preferred editing option based on, at least in part, historic editing actions for a plurality of different image items; and
    the method further comprises:
        transmitting, from the computing device to a server, a plurality of historic editing actions, each editing action associated with a particular image item of one or more image items;
        receiving, at the computing device and from the server, the preferred editing option to apply to the image item; and
        storing, in association with the user profile, the preferred editing option.

5. The method of claim 1, wherein:
    the method further comprises identifying, via metadata associated with the image item, that the image item was captured with the computing device; and
    the preferred editing option is identified based on, at least in part, identifying that the image item was captured with the computing device.

6. The method of claim 1, further comprising:
    receiving input associated with saving the image item;
    identifying one or more display settings associated with a display of the computing device;
    identifying that a display setting impacts how the image item is output at the display of the computing device;
    storing a representation of the display setting in a data file;
    associating the image item with the data file; and
    saving the associated image item and the data file.

7. The method of claim 1, wherein identifying the preferred editing option further comprises:
    identifying the high-quality image; and
    identifying the preferred editing option to apply to the high-quality image.

8. The method of claim 1, further comprising:
    receiving input associated with saving the image item;
    identifying one or more parameters associated with the trained machine learning algorithm;

storing a representation of the parameters in a data file;
associating the image item with the data file; and
saving the associated image item and the data file.

9. The method of claim 1 wherein:
the plurality of lower-quality images comprises reference images and images that refer to the reference images; and
identifying the preferred editing option further comprises:
identifying that one of the plurality of associated lower-quality images is a reference image; and
using the reference image as an input to the trained machine learning algorithm for improving the quality of the identified lower-quality image.

10. A system comprising:
input circuitry configured to:
receive an input for selecting, at a computing device and with an editing application, an image item comprising a high-quality image and a plurality of associated lower-quality images; and
processing circuitry configured to:
identify, via a user profile, a preferred editing option to apply to the image item, wherein the preferred editing option comprises:
identifying an image from the plurality of associated lower-quality images; and
improving, via a trained machine learning algorithm, a quality of the identified lower-quality image;
generate, for display in a user interface of the editing application, an icon for applying the preferred editing option to the image item;
receive user input associated with the icon; and
apply the preferred editing option to the image item.

11. The system of claim 10, wherein:
the input circuitry configured to receive the input for selecting the image item is further configured for selecting a plurality of image items;
the processing circuitry configured to generate the icon is further configured to generate the icon for applying the preferred editing option to the plurality of image items; and
the processing circuitry configured to apply the preferred editing option is further configured to apply the preferred editing option to each image item of the plurality of image items.

12. The system of claim 10, wherein:
the processing circuitry is further configured to:
generate, for display in the user interface of the editing application, a second icon for toggling between the selected image item and the image item with the preferred editing option applied;
generate, for display in the user interface of the editing application, first and second user interface elements, wherein:
the first user interface element is associated with accepting the edits to the image item; and
the second user interface element is associated with rejecting the edits to the image item; and
the input circuitry is further configured to:
receive a user input associated with the first user interface element; or
receive a user input associated with the second user interface element; and
the processing circuitry is further configured to:
based on, at least in part, receiving a user input associated with the first user interface element, save the edited image item with the original image item as a combined image item; or
based on, at least in part, receiving a user input associated with the second user interface element, reject the edits to the image item.

13. The system of claim 10, wherein:
the processing circuitry configured to identify the preferred editing option is further configured to determine the preferred editing option based on, at least in part, historic editing actions for a plurality of different image items; and
the processing circuitry is further configured to:
transmit, from the computing device to a server, a plurality of historic editing actions, each editing action associated with a particular image item of one or more image items;
receive, at the computing device and from the server, the preferred editing option to apply to the image item; and
store, in association with the user profile, the preferred editing option.

14. The system of claim 10, wherein:
the processing circuitry is further configured to identify, via metadata associated with the image item, that the image item was captured with the computing device; and
the processing circuitry configured to identify the preferred editing option is further configured to identify the preferred editing option based on, at least in part, identifying that the image item was captured with the computing device.

15. The system of claim 10, wherein:
the input circuitry is further configured to:
receive input associated with saving the image item; and
the processing circuitry is further configured to:
identify one or more display settings associated with a display of the computing device;
identify that a display setting impacts how the image item is output at the display of the computing device;
store a representation of the display setting in a data file;
associate the image item with the data file; and
save the associated image item and the data file.

16. The system of claim 10, wherein
the processing circuitry configured to identify the preferred editing option is further configured to:
identify the high-quality image; and
identify the preferred editing option to apply to the high-quality image.

17. The system of claim 10, wherein the processing circuitry is further configured to:
receive input associated with saving the image item;
identify one or more parameters associated with the trained machine learning algorithm;
store a representation of the parameters in a data file;
associate the image item with the data file; and
save the associated image item and the data file.

18. The system of claim 10, wherein:
the plurality of lower-quality images comprises reference images and images that refer to the reference images; and
the processing circuitry configured to identify the preferred editing option is further configured to:
identify that one of the plurality of associated lower-quality images is a reference image; and use the reference image as an input to the trained machine learning algorithm for improving the quality of the identified lower-quality image.

\* \* \* \* \*